United States Patent
Rointru et al.

[11] Patent Number: 6,162,141
[45] Date of Patent: Dec. 19, 2000

[54] TENSIONER FOR A MECHANICAL POWER TRANSMISSION, A TRANSMISSION INCLUDING SUCH A TENSIONER, AND A MOTOR VEHICLE ENGINE INCLUDING SUCH A TRANSMISSION

[75] Inventors: Claude Rointru, Joue-les-Tours; Denis Tricoche, Monts; Hervé Varin, Ballan, all of France

[73] Assignee: Hutchison, Paris, France

[21] Appl. No.: 08/935,134

[22] Filed: Sep. 22, 1997

[30] Foreign Application Priority Data

Oct. 25, 1996 [FR] France .................................. 96 13047

[51] Int. Cl.⁷ ...................................................... F16H 7/12
[52] U.S. Cl. ........................................... 474/109; 474/190
[58] Field of Search .................................... 474/190–191, 474/101, 109, 111, 113, 117, 118, 133, 135; 384/492, 907, 908, 909

[56] References Cited

U.S. PATENT DOCUMENTS

| | | | |
|---|---|---|---|
| 2,590,182 | 3/1952 | Kessler et al. ............................ | 74/221 |
| 3,216,267 | 11/1965 | Dolza ....................................... | 74/219 |
| 3,989,314 | 11/1976 | Reinsma et al. ......................... | 474/191 |
| 4,324,552 | 4/1982 | Boushek, Jr. et al. .................. | 474/118 |
| 4,557,710 | 12/1985 | Greider ................................... | 474/118 |
| 4,589,861 | 5/1986 | Dodge ..................................... | 474/191 |
| 4,674,996 | 6/1987 | Anno et al. .............................. | 474/118 |
| 4,718,544 | 1/1988 | Herren .................................... | 474/191 |
| 4,822,321 | 4/1989 | Webb ....................................... | 474/117 |
| 4,878,411 | 11/1989 | Laskowski et al. ..................... | 474/191 |
| 5,271,742 | 12/1993 | Mitcham ................................. | 474/112 |
| 5,346,438 | 9/1994 | Gerstenberger et al. .............. | 474/191 |
| 5,540,627 | 7/1996 | Miyata .................................... | 474/135 |
| 5,713,808 | 2/1998 | Ohta ....................................... | 474/135 |
| 5,769,747 | 6/1998 | Kuhn et al. ............................ | 474/135 |

FOREIGN PATENT DOCUMENTS

| | | |
|---|---|---|
| 0193802 | 9/1986 | European Pat. Off. . |
| 0 541 387 | 5/1993 | European Pat. Off. . |
| 0628 750 | 12/1994 | European Pat. Off. . |
| 2819333 | 11/1979 | Germany . |
| 1 394 153 | 5/1975 | United Kingdom . |
| PCT/FR93/ 00245 | 3/1993 | WIPO . |

*Primary Examiner*—Thomas R. Hannon
*Attorney, Agent, or Firm*—Oblon, Spivak, McClelland, Maier & Neustadt, P.C.

[57] ABSTRACT

A belt tensioner for a mechanical power transmission such as in a motor vehicle engine. The belt tensioner includes a wheel for bearing against the belt and a resilient return device for ensuring that the wheel bears against the belt with pre-stress. The wheel further includes a covering of vibration absorbing material. The invention is particularly applicable to mechanical engineering and specifically to the car industry.

11 Claims, 2 Drawing Sheets

TENSIONER FOR A MECHANICAL POWER TRANSMISSION, A TRANSMISSION INCLUDING SUCH A TENSIONER, AND A MOTOR VEHICLE ENGINE INCLUDING SUCH A TRANSMISSION

The present invention relates mainly to a belt tensioner for a mechanical power transmission, to a mechanical power transmission including such a tensioner, and also to a motor vehicle engine including such a mechanical power transmission.

BACKGROUND OF THE INVENTION

Tensioners are usually implemented to compensate for geometrical variations in the belts of mechanical power transmissions of the kind including a belt passing over a driving pulley driven by an engine shaft and in turn driving at least one driven pulley. The wheel of such a tensioner is applied with pre-stress against the drive belt to minimize variations in the mechanical tension in the belt in spite of variations in the operating conditions of the engine over a relatively long period of time. By taking up static and dynamic lengthening of the belt, the tensioner avoids the belt sliding relative to the cheekplates of the driving or driven pulleys in a mechanical power transmission. Such a tensioner includes a wheel pressed against the belt and mounted to rotate about a first axis, the wheel support being capable of pivoting about a second axis that is separate from and parallel to said first axis. Resilient return means enable the wheel to induce mechanical tension in the belt to compensate for static and/or dynamic variations in the length thereof due in particular to cyclical irregularities of the engine while running, in particular when idling or during sudden changes generated by switching on and/or off devices that are driven by the shafts rotated by the pulleys of the mechanical power transmission.

A tensioner also includes damper means, in particular hydraulic damper means, or as described in French patent application No. 93 06898 an elastomer fitting for the wheel, in which case the elastomer fitting also acts as resilient return means pressing the wheel against the belt. Although the tensioner of French patent application No. 93 06898 provides the belt with a degree of damping against vibration, its static and dynamic performance as a tensioner are limited by the absence of resilient return means other than those provided by the elastomer covering. The use of such a tensioner is thus limited to small tensions and small variations in the length of the belt.

Unfortunately, the belt travelling under mechanical tension vibrates and transmits acoustic vibrations to the air, thereby generating noise which can be troublesome, particularly for the passengers of a motor vehicle when the belt is a transmission or distribution belt for a motor vehicle engine.

OBJECTS AND SUMMARY OF THE INVENTION

Consequently, an object of the present invention is to provide a mechanical power transmission that presents a low level of noise.

Another object of the present invention is to provide a mechanical power transmission presenting a low level of vibration.

Another object of the present invention is to provide a tensioner that eliminates belt vibration and that has excellent dynamic and static performance.

These objects are achieved by a tensioner of the invention comprising bearing means, in particular a wheel, for bearing against the belt and provided with a covering of sound-absorbing material, and resilient return means distinct from the covering of vibration-absorbing material of the means that bear against the belt.

The invention mainly provides a belt tensioner comprising bearing means for bearing against the belt and resilient return means for ensuring that the bearing means bear against the belt with pre-stress, wherein the bearing means further include a covering of vibration-absorbing material.

The invention also provides a tensioner, wherein the bearing means comprise a wheel and wherein the covering of vibration-absorbing material is a radially outer tire on the wheel and having a thickness lying in the range 1 mm to 10 mm.

The invention also provides a tensioner, wherein the vibration-absorbing material is an elastomer.

The invention also provides a tensioner, wherein the covering of vibration-absorbing material is of hardness lying in the range 30 to 95 on the Shore A scale, and preferably lying in the range 40 to 70 on the Shore A scale.

The invention also provides a tensioner, wherein said tensioner includes a linear spring.

The invention also provides a tensioner, including a coil spring for pressing the bearing means against the belt with pre-stress and a hydraulic damper circuit for damping variation in the length of the body of the tensioner.

The invention also provides a tensioner, wherein said tensioner includes a rotary spring.

The invention also provides a mechanical power transmission including at least one driving pulley and at least one driven pulley, a belt passing over the driving and driven pulleys, the transmission including a tensioner of the invention, in which the bearing means are pressed with pre-stress against the belt.

The invention also provides a transmission of the invention wherein said transmission is an accessory drive system for a motor vehicle engine, including a pulley constrained to rotate with the crank shaft and a pulley constrained to rotate with the axis of an alternator.

The invention also provides an engine including a tensioner and/or a transmission of the invention.

BRIEF DESCRIPTION OF THE DRAWINGS

The invention will be better understood from the following description and the accompanying figures given as non-limiting examples, and in which:

In FIGS. 1 and 2, the same references are used to designate the same elements.

MORE DETAILED DESCRIPTION

Figure 1:
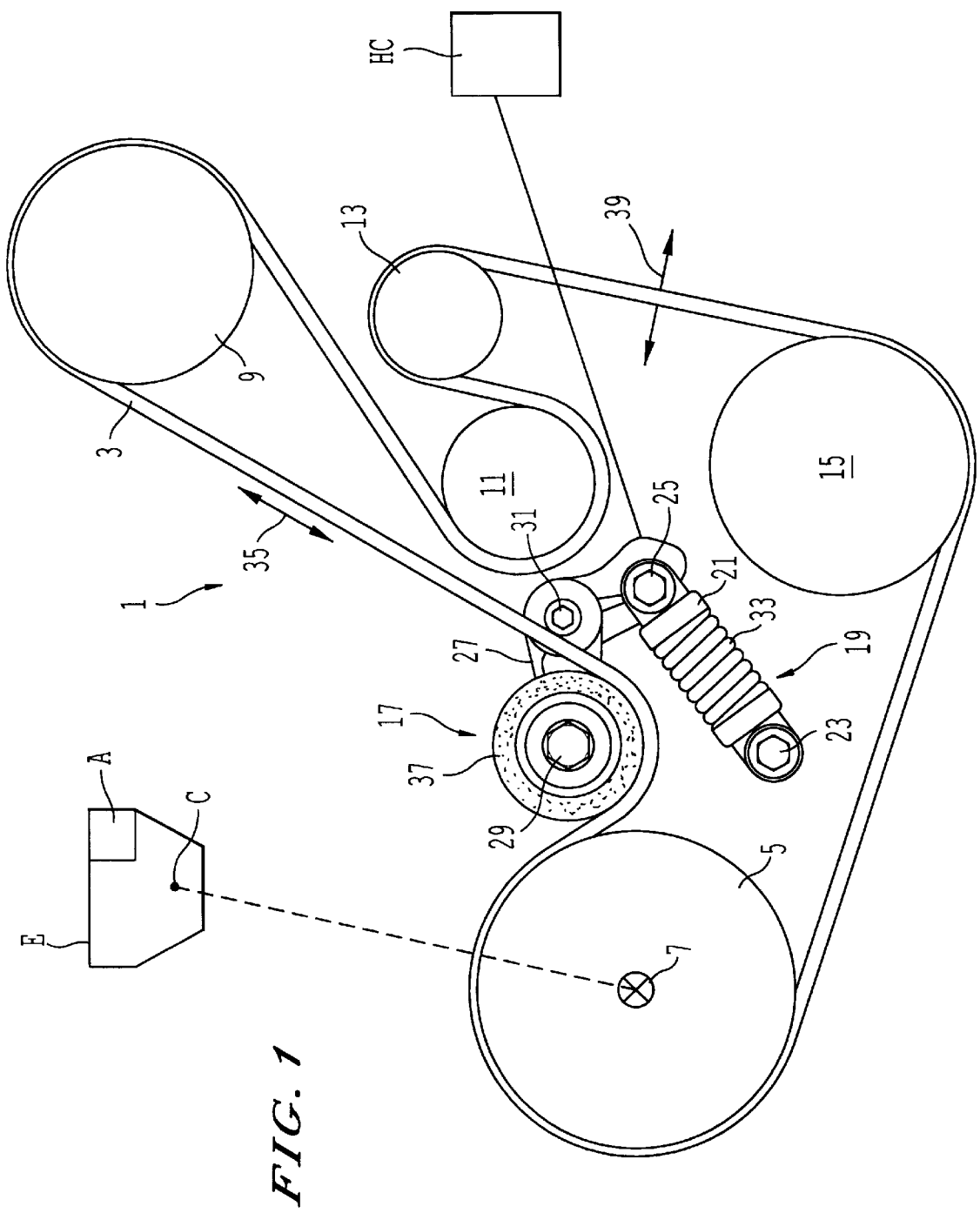
FIG. 1 is an end view of a mechanical power transmission including a tensioner having a linear spring of the present invention.
Figure 2:
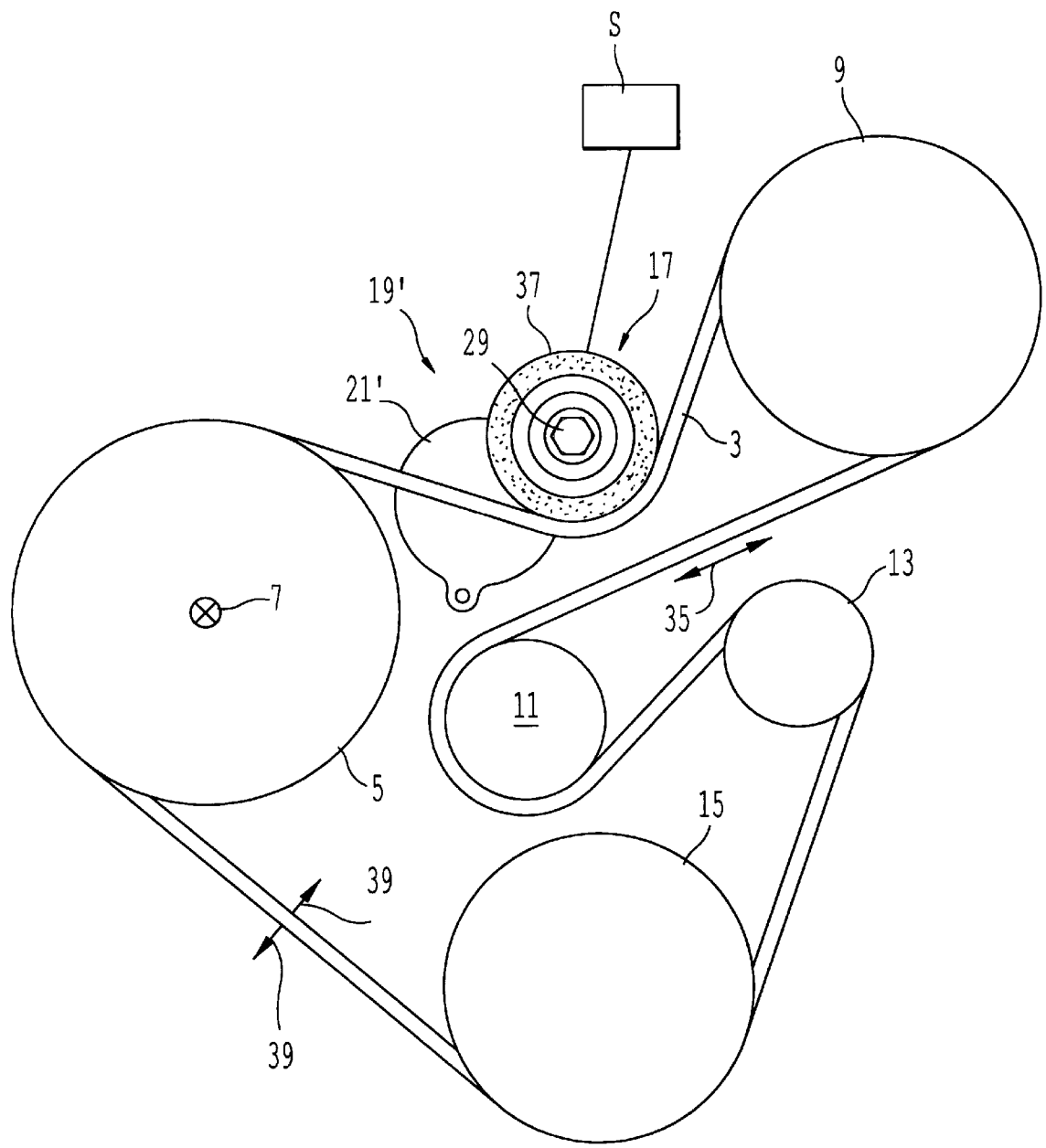
FIG. 2 is an end view of a mechanical power transmission including a tensioner having a rotary spring of the present invention.

In FIGS. 1 and 2, there can be seen two examples of a mechanical power transmission having a belt 3 and referred to, in the car industry, as the accessory drive system. The belt 3 passes successively over a pulley 5 constrained to rotate with the crank shaft 7 of a crank case C a motor vehicle engine E, the pulley 5 driving the entire accessory drive system of FIGS. 1 and 2.

Thereafter the belt 3 passes over a pulley 9 constrained to rotate the shaft of an alternator A, over a deflector wheel 11, over a pulley 13 of a hydraulic pump for feeding fluid under pressure to the power-assisted steering of the vehicle, and over a pulley 15 constrained to rotate with the shaft of the vehicle engine water pump.

In the example shown in FIG. 1, a wheel 17 of a linear tensioner 19 bears against the outside face of the belt 3. In the non-limiting example shown in FIG. 1, the tensioner 19 is of the type comprising a body 21 fitted at a first end with a first eye 23 hinged on a pin secured to the cylinder block (not shown), and at a second end of the body 21 remote from the first end, it has an eye 25 fixed to a first end of an L-shaped bell-crank 27. The other end of the bell-crank 27 carries the wheel 17 which is free to rotate about a pin 29. Advantageously, the bell-crank 27 is mounted to pivot on the cylinder block about a pin 31 situated at the intersection between the limbs of the L-shape. The eye 25 allows the bell-crank 27 to pivot relative to the body 21 of the tensioner 19, while the eye 23 allows the body 21 of the tensioner 19 to pivot relative to the cylinder block. The body 21 of the tensioner 19 includes resilient means, e.g. a linear coil spring 33, for pressing the wheel 17 with pre-stress against the belt 3. The pre-stress exerted on the belt 3 lies, for example, in the range 20 N to 800 N, preferably in the range 70 N to 600 N, and advantageously in the range 80 N to 500 N. Advantageously, the body 21 of the tensioner 19 also includes a coaxial hydraulic circuit HC for damping longitudinal vibration of the belt, as represented by arrow 35. An example of such a hydraulic circuit is described in international application PCT/FR93/00245.

FIG. 2 shows a power transmission analogous to that of FIG. 1 in which the tensioner 19 is replaced by a tensioner 19' including resilient means and in particular a rotary spring S exerting torque on the wheel 17 urging it towards the belt 3 in such a manner as to press the wheel 17 against the belt 3 with pre-stress. The wheel 19' comprises a body 21' that is substantially cylindrical and disposed eccentrically relative to the axis of rotation 29 of the wheel 17.

The wheels 17 of the tensioners 19 and 19' of the present invention may include smooth bearings, in particular bearings made of ceramics, PTFE, or metal, or advantageously they may include a rolling bearing, in particular a ball bearing or a roller bearing.

The wheels 17 of the tensioners 19 and 19' of the present invention carry a radially outer covering or tire 37 made of vibration-absorbing material. The covering 37 serves to damp transverse vibration 39 of the belt 3.

The term "transverse vibration" means a vibration 39 which, as shown in FIGS. 1 and 2, is in a direction perpendicular to the axis of rotation of the wheels 17. The term "vibration-absorbing" material is used to cover a material which possesses a tangent δ (values obtained for 2% stress in compression at 100° C. at 25 Hz and with 5% pre-stress), lying for example in the range 0.05 to 0.65, preferably in the range 0.07 to 0.50, and for example equal to 0.095.

The material constituting the covering or tire 37 is advantageously selected from rubbers of the chloroprene type, EPDM, nitrile-butadiene rubbers (HNBR), EPR, ACSM, IIR, thermoplastic materials, thermosetting materials, and/or mixtures thereof. Advantageously, the material used withstands high temperatures well. The outside face of the tire 37 or covering 37 may be itself covered in cloth, optionally non-woven cloth, or some other substance. By way of example, the hardness of the material constituting the tires 37 or the covering 37 lies in the range 30 to 95 on the Shore A scale, preferably in the range 40 to 70 on the Shore A scale, and advantageously in the range 55 to 65 on the Shore A scale.

Without going beyond the ambit of the present invention, the wheel 17 may include cheekplates, e.g. made of metal. The covering or tire 37 of vibration-absorbing material can, for example, be received in the bottom of a groove of tapering section defined by the inside walls of the cheekplates and a cylindrical bottom wall coaxial with the housing for the axis of the tensioner. In a variant embodiment, the covering or tire 37 also extends over the inside faces of the cheekplates.

Naturally, the mechanical belt drive of FIGS. 1 and 2 is given purely by way of non-limiting example and the positions and numbers of pulleys and wheels used depend on the shafts that are to be driven by the belt.

The present invention is particularly applicable to mechanical engineering.

A main application of the invention lies in the car industry.

What is claimed is:

1. A belt tensioner for a belt comprising a rotatable member for bearing against the belt and a resilient return member for ensuring that the rotatable member bears against the belt with pre-stress, the rotatable member further including a covering of vibration-absorbing material, said vibration-absorbing covering acting to reduce transverse vibrations of said belt when said belt contacts said rotatable member.

2. A tensioner according to claim 1, wherein the bearing member comprises a wheel and wherein the covering of vibration-absorbing material is a radially outer tire on the wheel and having a thickness in the range 1 mm to 10 mm.

3. A tensioner according to claim 1, wherein the vibration-absorbing material is an elastomer.

4. A tensioner according to claim 1, wherein the covering of vibration-absorbing material is of hardness in the range 30 to 95 on the Shore A scale.

5. A tensioner according to claim 4, wherein the hardness is in the range 40 to 70 on the Shore A scale.

6. A tensioner according to claim 1, wherein said resilient return member includes a linear spring.

7. A tensioner according to claim 6, wherein said linear spring comprises a coil spring for pressing the bearing member against the belt with pre-stress and said tensioner further comprises a hydraulic damper circuit for damping variation in the length of the tensioner.

8. A tensioner according to claim 1, wherein said resilient return member includes a rotary spring.

9. A mechanical power transmission including at least one driving pulley and at least one driven pulley, a belt passing over the driving and driven pulleys, the transmission including a belt tensioner comprising a rotatable bearing member for bearing against the belt and a resilient return member for ensuring that the rotatable bearing member bears against the belt with pre-stress, the rotatable bearing member further including a covering of vibration-absorption material, said vibration-absorbing covering acting to reduce transverse vibrations of said belt when said belt contacts said bearing member.

10. A transmission according to claim 8, wherein said transmission comprises an accessory drive system for a motor vehicle engine having a crank shaft and an alternator, wherein said driving pulley is a pulley constrained to rotate with the crank shaft and said driven pulley is a pulley constrained to rotate with an axis of rotation of the alternator.

11. An engine including a mechanical power transmission including at least one driving pulley and at least one driven pulley, a belt passing over the driving and driven pulleys, the transmission including a belt tensioner comprising rotatable bearing member for bearing against the belt and resilient return means for ensuring that the member bears against the belt with pre-stress, the bearing member further including a covering of vibration-absorbing material said vibration-absorbing covering acting to reduce transverse vibrations of said belt when said belt contacts said bearing member.

* * * * *

UNITED STATES PATENT AND TRADEMARK OFFICE
CERTIFICATE OF CORRECTION

PATENT NO. : 6,162,141

DATED : December 19, 2000

INVENTOR(S): Claude ROINTRU, et al.

It is certified that an error appears in the above-identified patent and that said Letters Patent is hereby corrected as shown below:

On the Title page, the CPA information has been omitted. It should read as follows:

--[45]  Date of Patent:  **\*Dec. 19, 2000** --

--[\*] Notice:   This patent issued on a continued prosecution application filed under 37 CFR 1.53(d), and is subject to the twenty year patent term provisions of 35 U.S.C. 154(a) (2).--

On the title page, item [73], the Assignee's name is incorrect. Item [73] should read as follows:

--[73]  Assignee:  Hutchinson, Paris, France --

Signed and Sealed this

Eighth Day of May, 2001

*Attest:*

NICHOLAS P. GODICI

*Attesting Officer*    *Acting Director of the United States Patent and Trademark Office*